United States Patent [19]

Boyden

[11] Patent Number: 5,406,827
[45] Date of Patent: Apr. 18, 1995

[54] PITCH/TENSION DEVICE

[76] Inventor: Willis G. Boyden, P.O. Box 83533, Los Angeles, Calif. 90083

[21] Appl. No.: 57,878

[22] Filed: May 7, 1993

[51] Int. Cl.⁶ .............................................. G01L 25/00
[52] U.S. Cl. ..................................... 73/1 B; 73/862.43
[58] Field of Search ...................... 73/862.391, 862.41, 73/862.43, 862.452, 1 B; 273/73 A, 73 B, 73 E; 84/454, 455, DIG. 18

[56] References Cited

U.S. PATENT DOCUMENTS

| | | | |
|---|---|---|---|
| 2,040,874 | 5/1936 | Pack | 73/862.41 |
| 2,265,786 | 12/1941 | White, Jr. | 73/862.41 |
| 3,501,992 | 3/1970 | Osborn et al. | 84/454 |
| 4,088,052 | 5/1978 | Hedrick | 84/454 |
| 4,143,575 | 3/1979 | Oliver | 84/726 |
| 4,158,962 | 6/1979 | Conoval | 73/862.41 |
| 4,252,048 | 2/1981 | Pogoda | 84/454 |
| 4,426,907 | 1/1984 | Scholz | 84/454 |
| 4,472,994 | 9/1984 | Armstrong | 84/726 |
| 5,007,294 | 4/1991 | Matjasic | 73/862.41 |
| 5,016,515 | 5/1991 | Scott | 84/454 |
| 5,038,657 | 8/1991 | Bubley | 84/455 |
| 5,056,404 | 10/1991 | Wyss | 84/725 |
| 5,060,524 | 10/1991 | Artola | 73/862.41 |
| 5,065,660 | 11/1991 | de Buda | 84/455 |

Primary Examiner—Richard E. Chilcot, Jr.
Assistant Examiner—Elizabeth L. Dougherty

[57] ABSTRACT

The pitch/tension device is a device to determine the tension, in pounds, in a taut string or strings, such as a tennis racket.

There are two methods of determining the tension. In the first method, the pitch/tension device is first adjusted for racket type or size, and string gauge. The racket is then plucked, or otherwise sound, and the audio pitch emanating from the pitch/tension device is adjusted to approximate the pitch of the racket, wherein the tension of the racket is displayed. In the second method, the known racket tension at some previous time, such as at restringing, is set into the pitch/tension device as follows: the racket is plucked, or otherwise sounded, the tone emanating from the pitch/tension device is brought into agreement with the pitch of the plucked strings, the display is adjusted to agree with the known racket tension, and this setting is recorded. The present racket tension is determined by adjusting the pitch/tension device to this setting, plucking the strings, bringing the tone emanating from the pitch/tension device into agreement with the pitch of the plucked strings, and reading the tension on the display.

4 Claims, 8 Drawing Sheets

PITCH/TENSION DEVICE

BACKGROUND OF THE INVENTION

The natural frequency or pitch of a taut string, or taught strings is defined by the following equation
$f = (1/L)\sqrt{(T/M)}$
where:
T = Tension in Strings
f = Frequency of Vibration
M = Mass Density of Strings
L = Length of Strings
Conversely, if the frequency is known, other things being equal, the tension may be determined.

The above equation may be utilized to determine, for instance, the tension, or of a tennis racket. The structure of the strings in a tennis racket essentially involves strings of equal tension, fixed mass per given length, and varying string lengths. The strings are usually of nylon or synthetic gut polymer composition, having a diameter from 15 to 17 gauge (1.38 mm to 1.22 mm); usually 16 gauge (1.30 mm). Current-day adult rackets are wound with areas varying from roughly 90 to 125 square inches playing area, with the vast majority (95%) being from 95 to 115 square inches in playing area.

For a given string size and mass, and given racket model, the tension varies as the square-root of the natural frequency of the racket. Once the natural frequency is determined, the string tension, in pounds, can be determined. Other factors will have an effect, such as the string size and mass, but for a given string size and mass a close approximation to the racket tension can be determined from the natural frequency of the racket.

SUMMARY OF THE INVENTION

The pitch/tension device provides a means for determining the tension in a taut string, or strings, such as a tennis racket, by matching the tone or pitch of an adjustable sound to the pitch of the plucked, or otherwise sounded, strings.

There are two ways to use the pitch/tension device to determine the racket tension, in pounds; the first method wherein the racket tension is previously unknown, and the second method wherein the racket tension was previously known, such as right after the racket had been strung, or restrung.

In the first method, the racket is plucked to determine its natural frequency; the pitch/tension device is then adjusted until the pitch emanating from the pitch/tension device agrees aurally with the natural frequency of the racket. The pitch/tension device is then adjusted for racket type and string size. The approximate racket tension will then be displayed on the pitch/tension device.

In the second method, the pitch/tension device is preset at stringing or restringing as follows: The pitch/tension device is adjusted to emanate a pitch in aural agreement with the natural frequency of the racket, as determined by plucking the racket; the pitch/tension device is then adjusted until the tension, in pounds, shown on the display agrees with the known tension of the racket. This setting is recorded for future use. If the racket has not been restrung in the interim, the racket tension may be determined at any time in the future by adjusting the pitch/tension device to the previously recorded setting for that particular racket, plucking the strings to determine the racket's natural frequency, and adjusting the tone emanating from the pitch/tension device to aurally agree with the racket's natural frequency. The tension, or more appropriately loss in tension, of the racket, in pounds, will be displayed.

Figure 1:
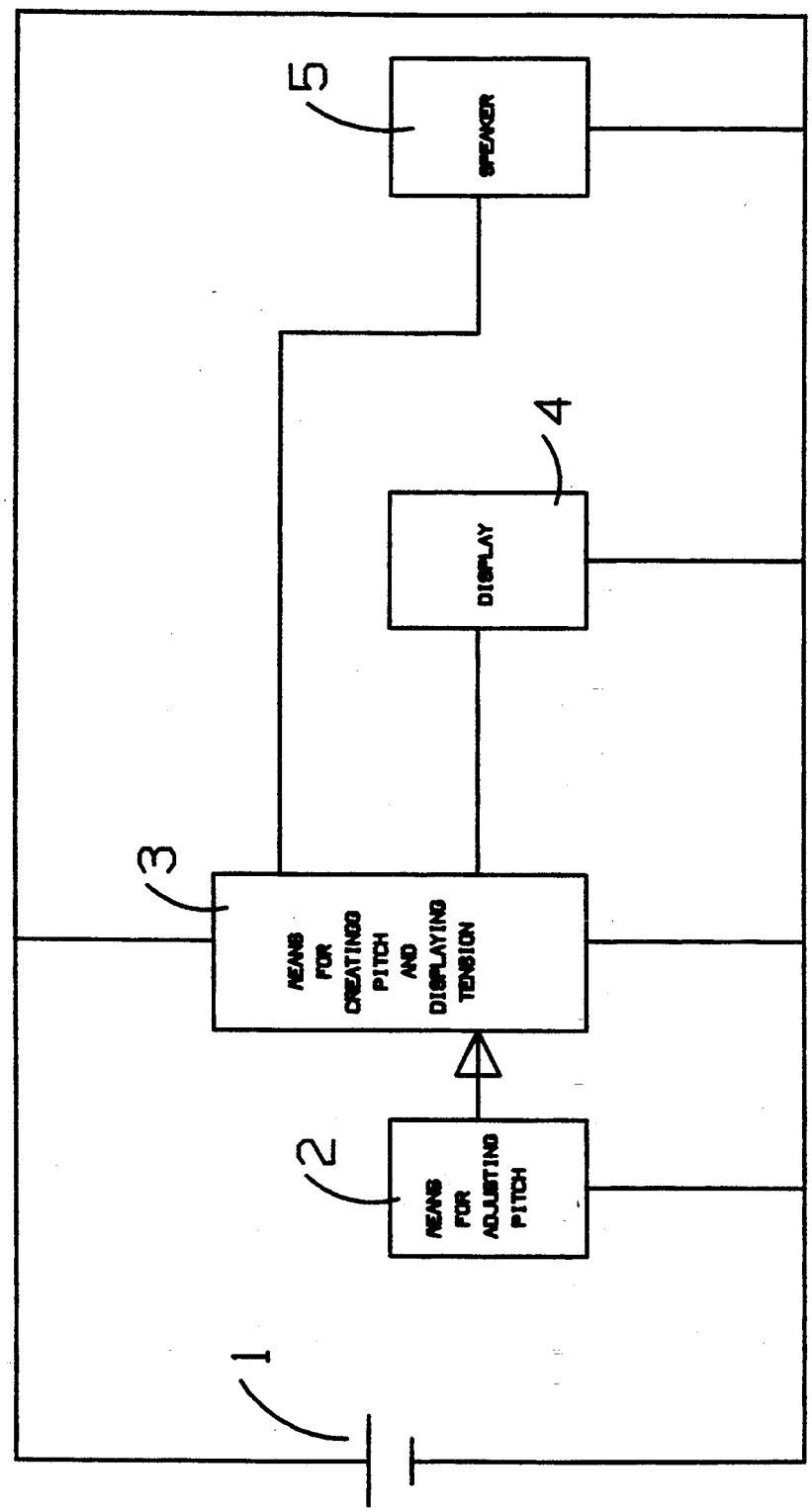
FIG. 1 is a symbolic representation of the preferred embodiment of the pitch/tension device.

Referenced Numerals in the Drawings
1. battery
2. means for adjusting pitch
3. means for creating pitch and displaying tension
4. display
5. speaker
6. means for adjusting oscillator frequency
7. oscillator
8. means for producing two separate output pulses
9. first counter
10. flip flop
11. second counter
12. converter/latch
13. first flip/flop
14. binary counter
15. logic recognition circuit
16. second flip/flop
17. first timer resistor
18. second timer resistor
19. timer capacitor
20. time out device
21. first one shot resistor
22. first one-shot capacitor
23. first one-shot
24. second one-shot resistor
25. second one-shot capacitor
26. second one-shot
27. BCD counter
28. first BCD to 7-segment decoder/latch
29. second BCD to 7-segment decoder/latch
30. first 7-segment display
31. second 7-segment display
32. microprocessor
33. means for adjusting the microprocessor oscillator frequency
34. microprocessor oscillator
35. shift register
36. first racket switch
37. second racket switch

DETAILED DESCRIPTION OF THE DRAWINGS

FIG. 1 is the preferred embodiment of the sound/tension device, with the minimum number of elements required to accomplish the intended purpose of the invention.

The means for creating pitch and displaying tension 3 is adjusted by the operator through the means for adjusting pitch 2 until the pitch (fundamental frequency) of the tone emanating from the speaker 5 matches the pitch (fundamental frequency) of the plucked strings. The approximate tension in the strings is displayed, in pounds, on the display 4. The operator must make an aural determination of the agreement between the pitch of the plucked strings and the pitch emanating from the speaker 5; and the operator must adjust the means for adjusting pitch 2 until such agreement occurs.

The means for creating pitch and displaying tension 3 is preadjusted at the factory to display a given tension at an absolute frequency or pitch.

The means for creating pitch and displaying tension 3 is also constructed so that at any given pitch or frequency emanating from the speaker 5, a known tension of the taught strings at this characteristic pitch tension will be displayed on the display 4. The ratio of one pitch or frequency to another pitch or frequency of taught strings varies approximately as the square-root of the ratio of one tension varies to the other tension of taught strings.

Figure 2:
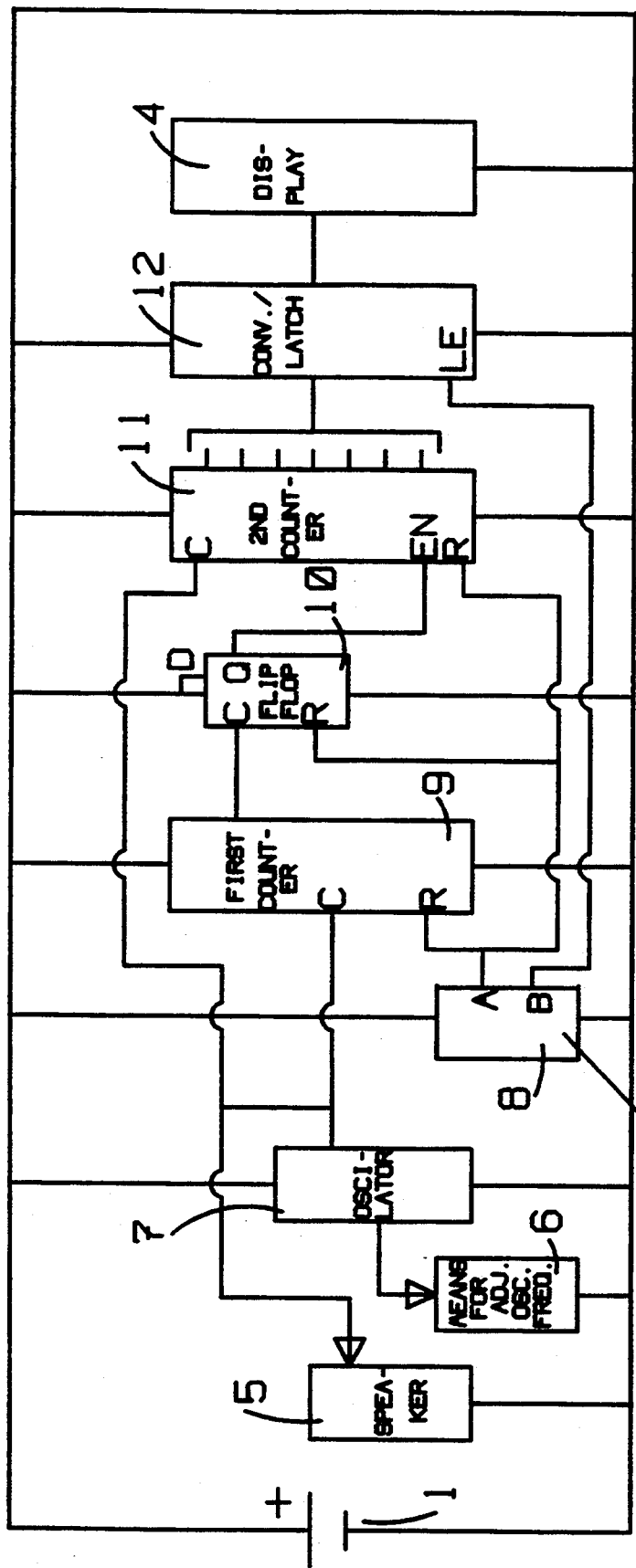
FIG. 2 and FIG. 3 are symbolic representations of a pitch/tension device using integrated circuits.

FIG. 2 is an integrated circuit embodiment of the pitch/tension device. The operator adjusts the frequency of the oscillator 7 by the means for adjusting oscillator frequency 6, which may be a simple potentiometer.

The output of the oscillator 7 drives the speaker 5, and also services as the clock input for the first counter 9 and second counter 11.

Output A of the means for producing two separate output pulses 8 represents means for periodically resetting the first counter 9, second counter 11, and flip/flop 10. Output B of the means for producing two separate output pulses 8 also represents means for latching the count of the second counter 11 into the converted/latch 12.

When the count of the first counter 9 has reached a predetermined amount, the flip/flop is set, by a higher order Q output of the first counter 9, enabling the second counter 11; the second counter 11 then starts counting from zero, until the A output of the means for producing two separate output pulses 8 resets it. As previously stated, just prior to resetting, the count in the second counter 11 is strobed into the converter/latch 12, by the B output of the means for producing two separate output pulses. The converter/latch 12 also converts the output of the second counter 11 from a binary or decade format to an appropriate format required to drive the display 4.

Although a circuit counting pulses for a fixed time would use less elements, it would not approximate the desired square-root relationship, and errors would be excessive. The outputs on the displays, 4 and 30, 31, shown in FIG. 2 and FIG. 3, while not exactly duplicating a square-root relationship between the racket's natural frequency and the racket tension, in pounds, for practical purposes, approximate this relationship within less than a pound over a range of 40 to 75 pounds. The pre-determined count in the first counter 9 required to set the flip/flop 10 is fixed and does not vary with frequency. The count in the second counter 11 does vary with frequency.

Power is supplied by the battery 1.

Figure 3:
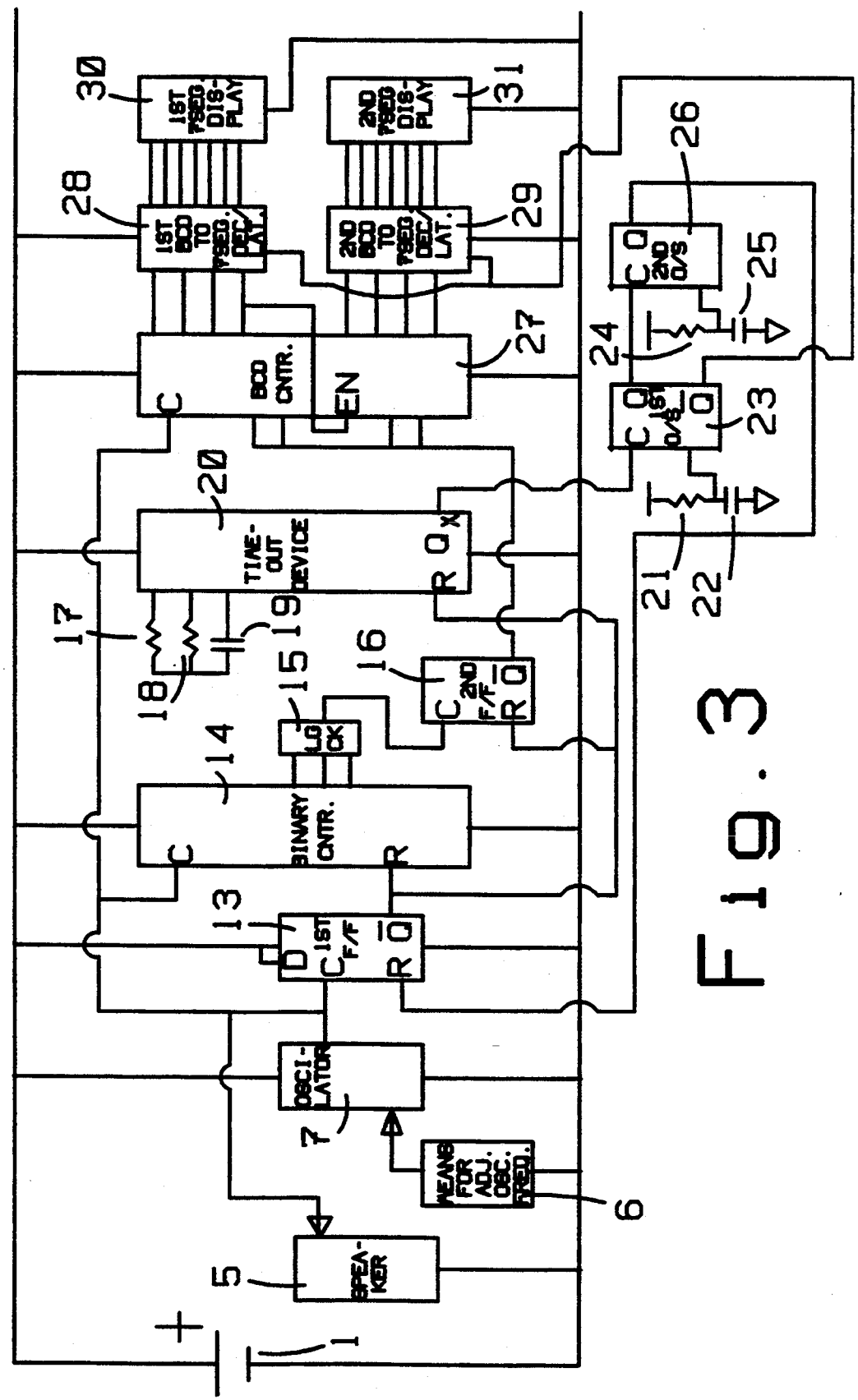

FIG. 3 is another discreet embodiment of the pitch/tension device utilizing standard integrated circuits. While the parts count is considerably more than the microprocessor embodiment shown in FIG. 4, the capital commitment and time dedication to circuit development is much lower.

In FIG. 3, the means for adjusting oscillator frequency 6 is adjusted by the operator to agree with the pitch of the natural frequency of the plucked strings under test. The means for adjusting oscillator frequency 6 changes the frequency of the oscillator 7. The output of the oscillator 7 drives the speaker 5, and also serves as the clock for the first flip/flop 13, binary counter 14 and BCD counter 27.

The first flip/flop 13 is a standard D-type flip/flop similar to the 555 type, with the D input connected to the positive rail.

A pulse from the oscillator 7 sets the first flip-flop 13, which takes the binary counter 14, second flip/flop 16, and timeout oscillator 20 out of the reset mode, and initiates the sequence. The binary counter 14, which may be a standard ripple counter, counts the subsequent pulses from the oscillator 7; the time out device 20, which may be a standard ripple counter, begins counting up at its' own rate, as determined by first timer resistor 17, second timer resistor 18, and timer capacitor 19.

The inputs of the logic recognition circuit 15 are connected to higher order outputs of the binary counter 14. When the binary counter 14 reaches a pre-determined count, the output from the logic recognition circuit 15 goes high, and the second flip/flop 16 is set. This enables the BCD counter 27 to begin counting from zero the ensuing pulses from the oscillator 7. This count represents the pounds of tension in the strings.

When the time out device 20 has timed out, the Qx output goes high, triggering the first one-shot 23. The pulse width of the first one-shot 23 is determined by first one-shot resistor 21 and first one-shot capacitor 22; the output pulse width of the first one-shot 23 is of relatively short duration.

The first one-shot 23 and second one-shot 26 may be a standard dual one-shot integrated circuit.

The Q output of the first one-shot 23 latches the output of the BCD counter 27 into the first BCD to 7-segment decoder/latch 28 and second BCD to 7-segment decoder/latch 29. The first BCD to 7-segment decoder/latch 28 and second BCD to 7-segment decoder latch 29 may be standard decoder/latch integrated circuits.

The BCD counter 27 may be a standard BCD counter integrated circuit.

When the first one-shot 23 has timed out, the second one-shot 26 is triggered on, and the first flip/flop 13 is reset. This resets the binary counter 14, time out device 20, and second flip/flop 16 to their initial states. When the second flip/flop 16 is reset, the BCD counter 27 is reset to its initial state.

The outputs of the first BCD to 7-segment decoder/latch 28 and second BCD to 7-segment decoder/latch 29 drive the first 7-segment display 30 and second 7-segment display 31; the two digits shown on the displays 30, 31 represents the racket tension, in pounds, in the strings.

The next pulse from the oscillator 7 re-initiates the sequence. Power is supplied by the battery 1.

Figure 4:
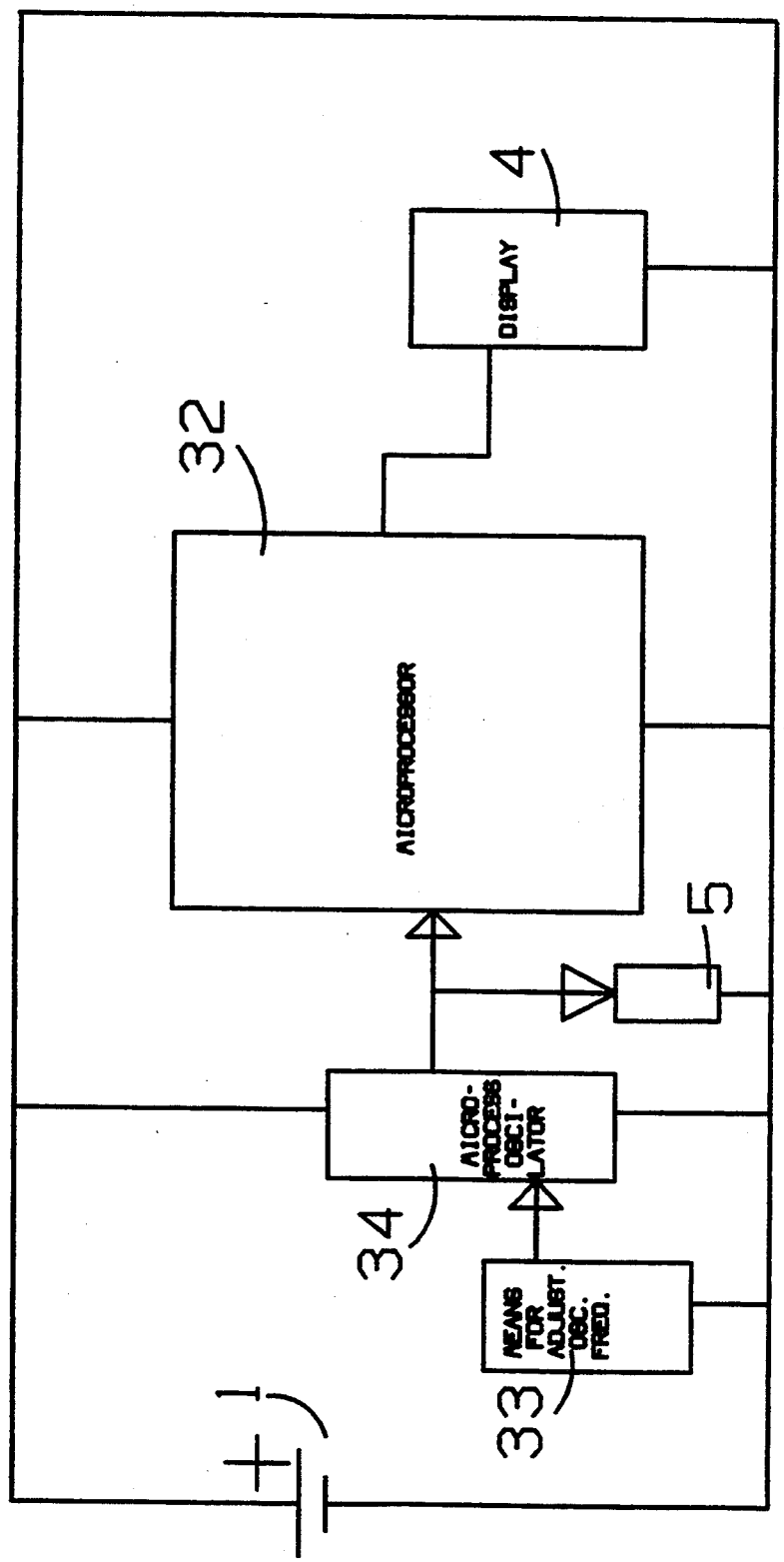
FIG. 4 is an embodiment of the pitch/tension device using a microprocessor.
Figure 5:
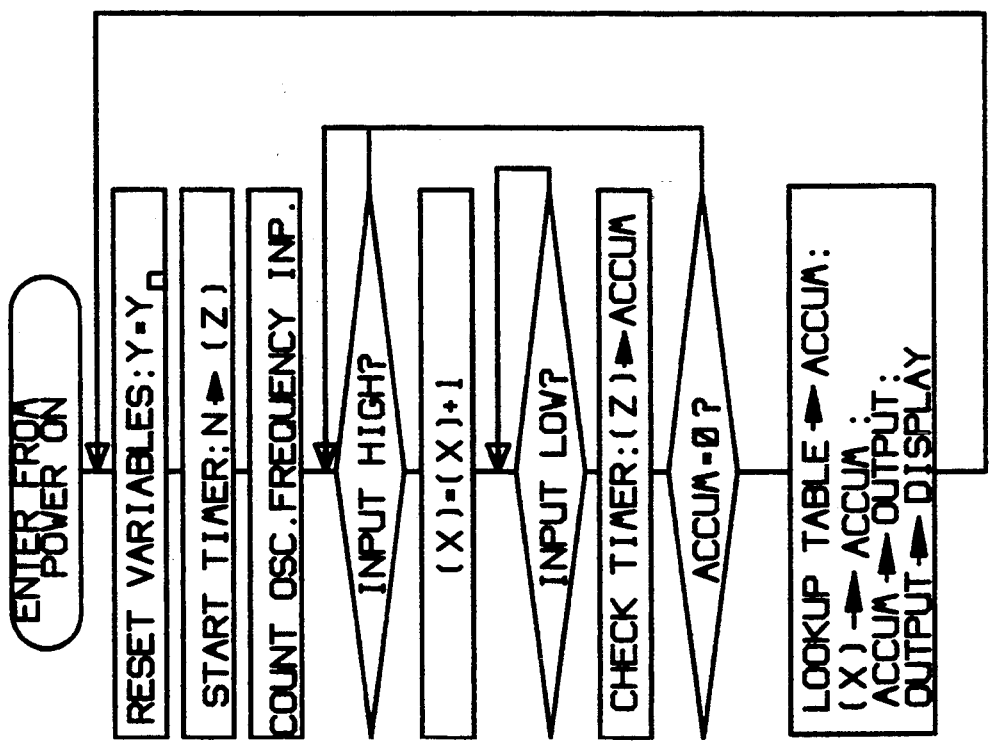
FIG. 5 is a flow diagram of the dedicated firmware program in the memory area of the microprocessor, in the microprocessor embodiment shown in FIG. 4.

The embodiment shown in FIG. 4 utilizes a microprocessor 32 as the central control unit; this embodiment represents a low element count inherent in microprocessor approaches. FIG. 5 depicts the flow chart for the firmware resident in the memory area of the microprocessor 32, which represents the functioning of this embodiment.

The microprocessor oscillator 34 generates a signal in the audio frequency range, which drives the speaker 5 creating an audio tone. This tone has a pitch (fundamental frequency) in the range of the characteristic pitch (fundamental frequency) of the taut strings. This pitch is manually adjusted by the operator, as in the other embodiments, through the means for adjusting the microprocessor oscillator frequency 33.

The output of the microprocessor oscillator 34 also serves as the input to the microprocessor 32.

Referring to FIG. 5, the microprocessor 32 counts these input pulses for a fixed time; then uses this count as the offset for the location of the appropriate tension in the look up table of the tension; this converted value is presented to the output of the microprocessor 23 to drive the display 4. The look up table is dedicated to simulate the pitch to tension square-root relationship of the taught strings.

The microprocessor oscillator 34 generates a signal in the audio frequency range, which drives the speaker 5 creating an audio tone. This tone has a pitch (fundamental frequency) in the range of the characteristic pitch (fundamental frequency) of the taut strings. This pitch is manually adjusted by the operator, as in the other embodiments, through the means for adjusting the microprocessor oscillator frequency 33.

The output of the microprocessor oscillator 34 also serves as the input to the microprocessor 32.

Referring to FIG. 5, the microprocessor 32 counts these input pulses for a fixed time; then uses this count as the offset for the location of the appropriate tension in the look up table of the tension; this converted value is presented to the output of the microprocessor 23 to drive the display 4. The look up table is dedicated to simulate the pitch to tension square-root relationship of the taught strings.

Figure 6:
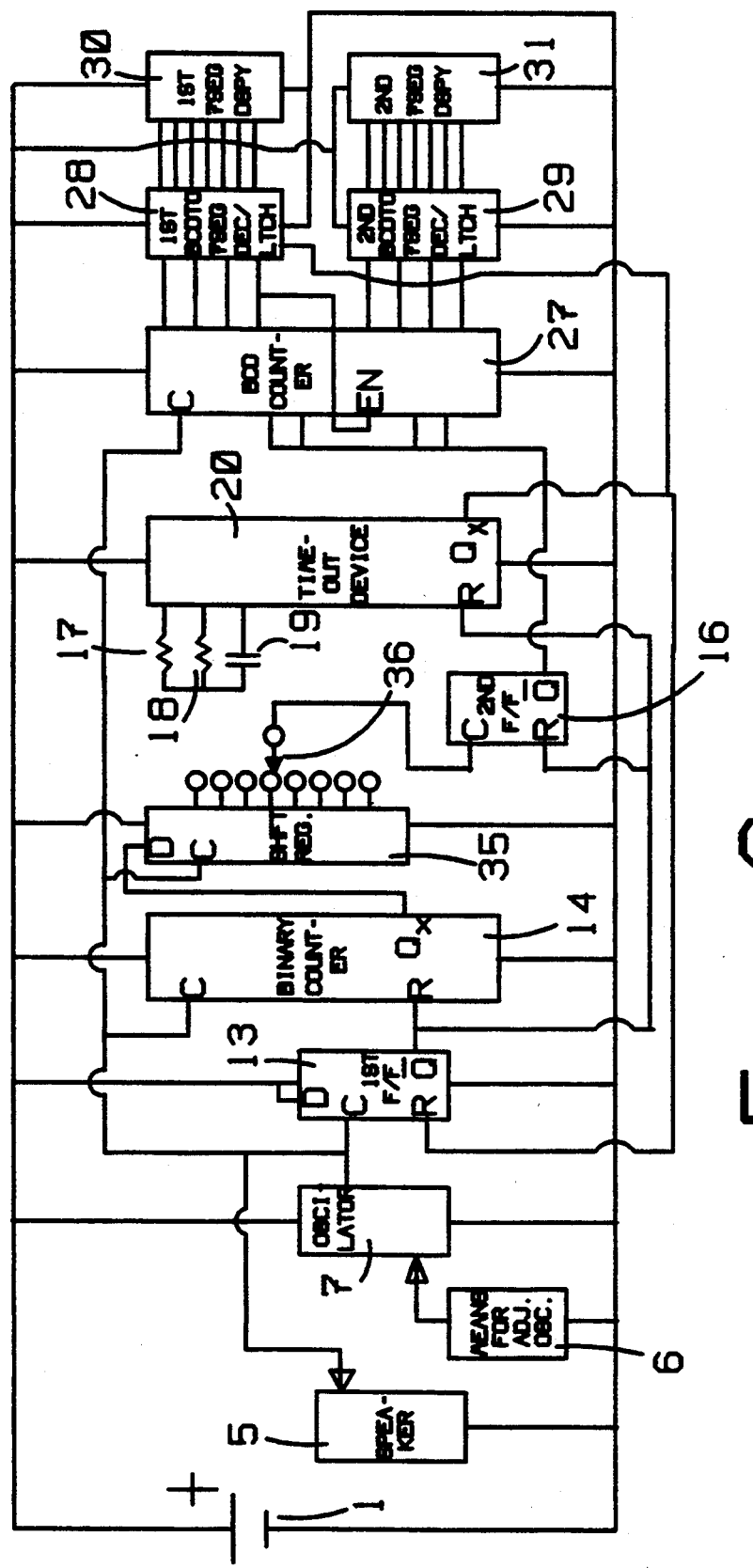
FIG. 6 is a symbolic representation of another embodiment of the pitch/tension device.

FIG. 6 is a racket adjustment embodiment of the pitch/tension device wherein a first racket switch 36 is added as a means for modifying the tension, in pounds, displayed depending on the particular racket being tested. Referring back to the formula for natural frequency, it is seen that the frequency of a taut string, or strings, varies as the inverse of the average string length. Thus with larger rackets a lower frequency can be expected; this is analagous to the low pitch of the large base drum compared to the treble pitch of the smaller snare drum. The first racket switch 36 is first set for a given racket string area and given racket model before proceeding with the rest of the test, as previously explained in the first method of test, or to agree with the previously determined setting, after restringing, in the second method of test. The shift register 35 can delay the pulse up to eight counts for the embodiment shown, depending on the setting of the first racket switch 36; this results in a lower displayed tension for a given frequency, implying a smaller racket. The rest of the circuit works similar to the embodiment shown in FIG. 3.

Figure 7:
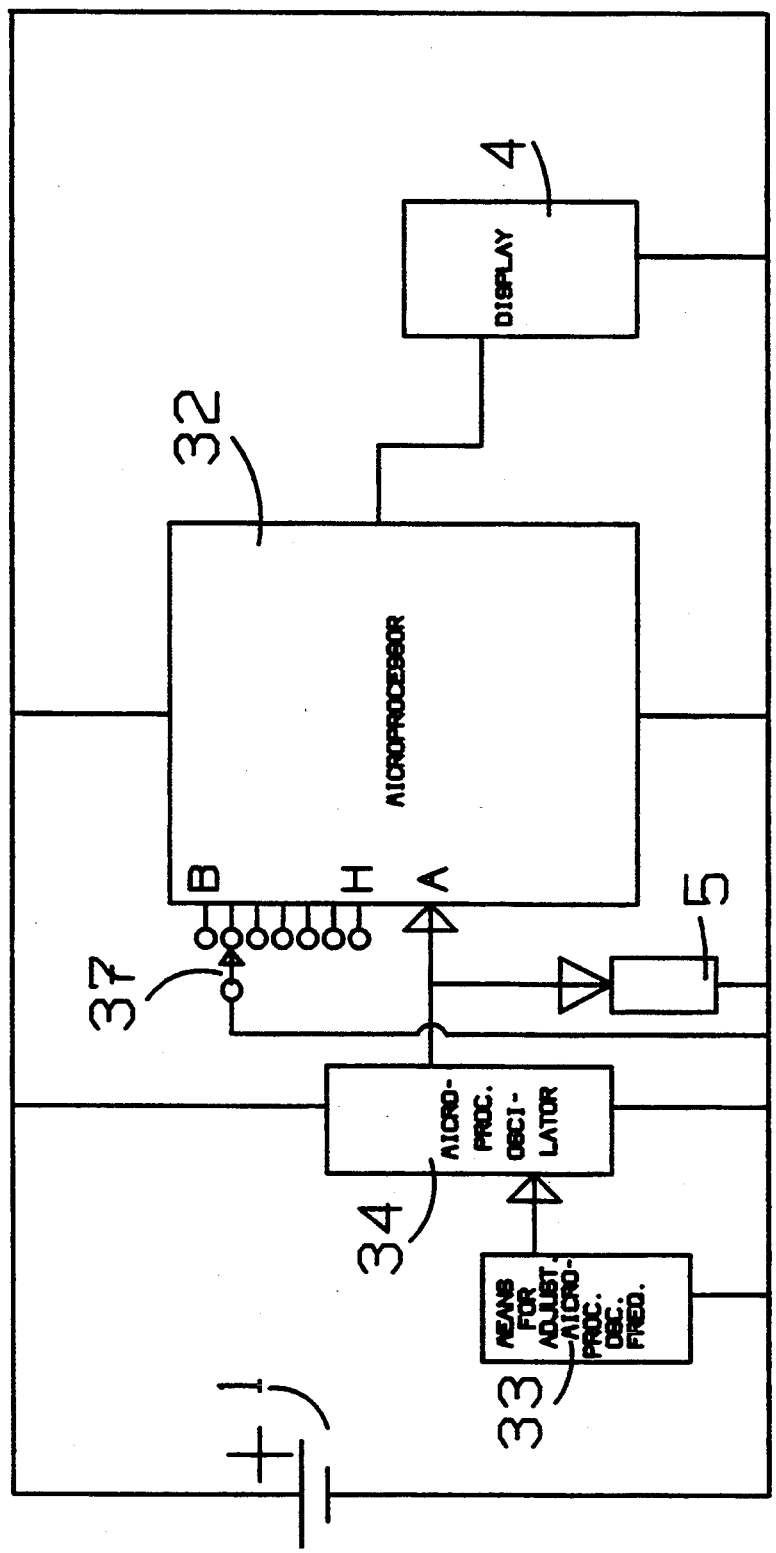
FIG. 7 is a symbolic representation of another microprocessor embodiment of the pitch/tension device.
Figure 8:
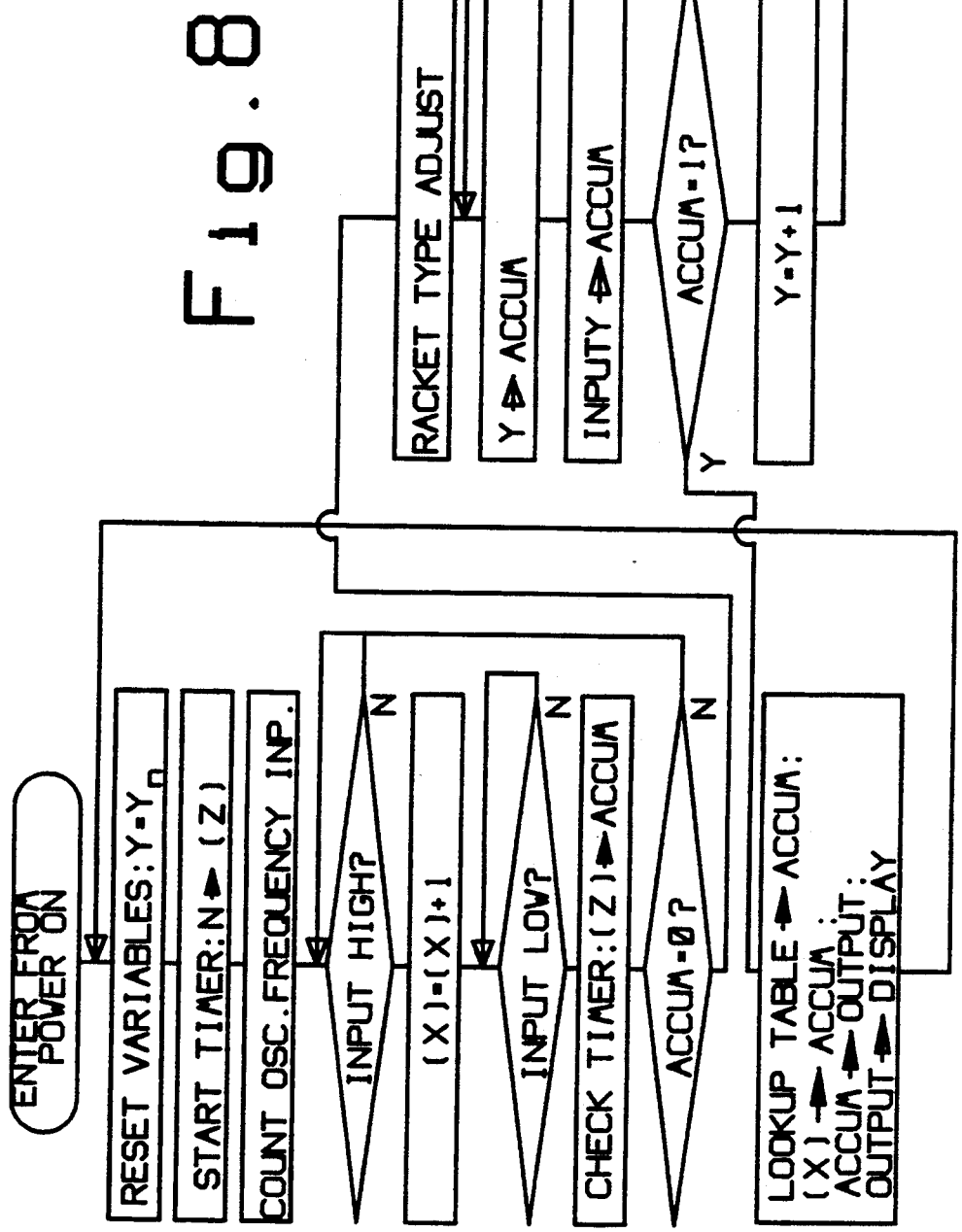
FIG. 8 is the flow chart for the embodiment shown in FIG. 7.

A microprocessor racket adjustment embodiment of the pitch/tension device is shown in FIG. 7. The operator first sets the second racket switch 37 for a given racket string area, and racket model, or for a predetermined setting, as in the previous embodiment, before proceeding with the rest of the test, as previously explained. The functioning of the program in firmware of the microprocessor 32 is shown in FIG. 8.

I claim:
1. A tension loss device comprising
a tone generation means;
means for adjusting said tone generation means;
means for displaying a numeric value corresponding to said tone generation means; and
means for calibrating said means for displaying a numeric value,
wherein said tone generation means comprises
means for generating a continuous series of pulses;
means for converting said continuous series of pulses to an audible sound; and
means for varying the repetition rate of said continuous series of pulses; and
said means for calibrating comprises
means for setting a time interval;
means for counting the pulses generated by said means for generating a continuous series of pulses which occur within the time interval set by said means for setting a time interval;
and said means for displaying a numeric value comprises means for displaying the number of pulses counted by said means for counting the pulses at the end of said set time interval.

2. The tension loss device of claim 1 wherein said means for calibrating further comprises
means for setting a time interval A;
means for setting a time interval B;
said means for setting said time interval B commences the start of said time interval B at a time following the commencement of said time interval A;
means for varying the duration of said time interval B corresponding to said means for varying the repetition rate;
means for counting the pulses generated by said means for generating a continuous series of pulses which occur within said set time interval B;
and said means for displaying a numeric value further comprises means for displaying the number of pulses counted by said means for counting the pulses at the end of said time interval B.

3. The tension loss device of claim 1 wherein said tone generation means further comprises
a microprocessor;
a speaker, said speaker being connected to an output of said microprocessor;
said means for adjusting comprises
a potentiometer, said potentiometer determining the operating frequency of said microprocessor;
said means for calibrating further comprises
a switch, said switch being connected to an input of said microprocessor;
and said means for displaying a numeric value further comprises
a display, said display being connected to an output of said microprocessor.

4. The tension loss device of claim 1 wherein said tone generation means further comprises
a speaker, said speaker connected to an output of said means for generating a continuous series of pulses;
said means for adjusting said tone generation means comprises means for adjusting the frequency of said means for generating a continuous series of pulses;
said means for calibrating further comprises
a first counter wherein the output of said first counter goes high when the count in said first counter is decreased to zero;

a second counter wherein clocks of said first and second counters are connected to an output of said means for generating a continuous series of pulses;

a first switch, said switch being connected to a load input of said first counter and determining the count required to bring the output of said first counter to zero;

a first counter enable means which enables said first counter to count when activated and which remains enabled for the duration of said set time interval;

a first counter disable means which disables said first counter when said output of said first counter goes high;

a second counter enable means which enables said second counter when activated which occurs when said output of said first counter goes high;

a latch, the inputs of said latch being connected to the outputs of said second counter and the outputs of said latch being connected to said means for displaying a numeric value;

a latching means which means is connected to an input of said latch; and means for setting a time interval C; wherein said latch means is activated at the end of said time interval C such that a count from the output of said second counter is latched into said latch at the end of said set time interval C.

* * * * *